United States Patent [19]

Gagnon et al.

[11] Patent Number: 4,886,940
[45] Date of Patent: Dec. 12, 1989

[54] BUS DUCT JOINT

[75] Inventors: Claude Gagnon, St-Jean-Sur-Ri; Claude Gelineau, Carignan; Pierre Raymond, St-Jean; Zygmunt P. Krzelowski, Iberville; George Galletly, Burlington, all of Canada

[73] Assignee: Westinghouse Canada Inc., Hamilton, Canada

[21] Appl. No.: 240,508

[22] Filed: Sep. 6, 1988

[51] Int. Cl.$^4$ ............................................. H01R 4/38
[52] U.S. Cl. ................................ 174/88 B; 174/16.2; 439/115; 439/210; 439/213
[58] Field of Search .................. 174/16 B, 88 B, 16.2; 439/114, 115, 210, 212, 213

[56] References Cited

U.S. PATENT DOCUMENTS

| | | | |
|---|---|---|---|
| 3,339,009 | 8/1967 | Davis et al. | 174/88 B |
| 3,384,854 | 5/1968 | Jorgensen et al. | 174/88 B |
| 3,566,331 | 2/1971 | Stanback et al. | 174/88 B X |
| 3,786,394 | 1/1974 | Koenig et al. | 174/88 B X |
| 4,174,143 | 11/1979 | Hicks, Jr. et al. | 174/88 B X |

FOREIGN PATENT DOCUMENTS

| | | | |
|---|---|---|---|
| 650972 | 10/1962 | Canada . | |
| 833154 | 1/1970 | Canada . | |
| 834926 | 2/1970 | Canada . | |
| 1010128 | 5/1977 | Canada . | |
| 1393090 | 5/1975 | United Kingdom | 174/88 B |

*Primary Examiner*—Morris H. Nimmo
*Attorney, Agent, or Firm*—E. H. Oldham

[57] ABSTRACT

A bus duct joint comprising a plurality of conductive links for joining the buses, a plurality of intervening insulators and a single pressure providing bolt passing through the links and the insulators and between the ends of the buses being joined to provide substantially uniform pressure on the surfaces of the buses. The intervening insulators align and retain the conductive links and locate the joint with respect to the buses.

11 Claims, 4 Drawing Sheets

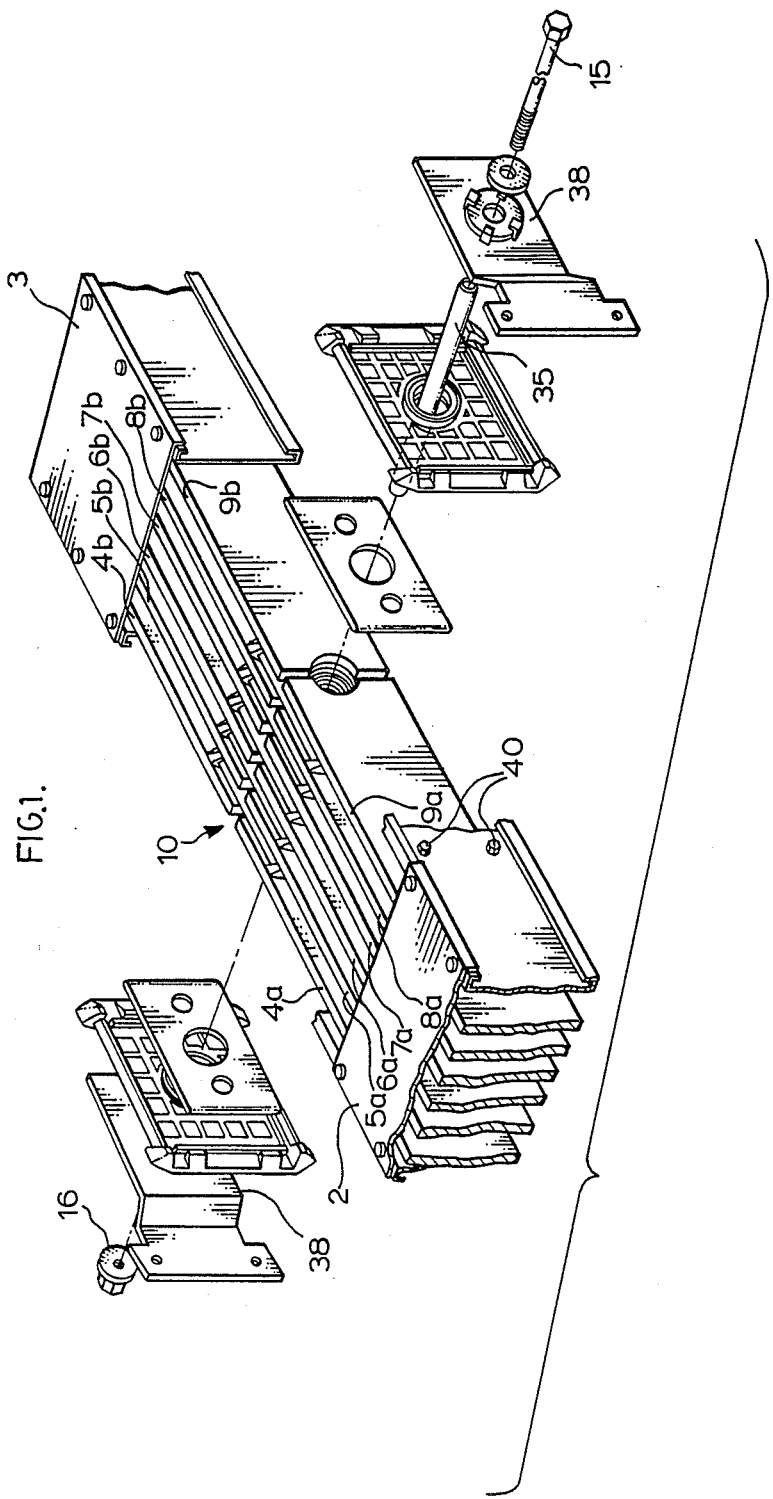

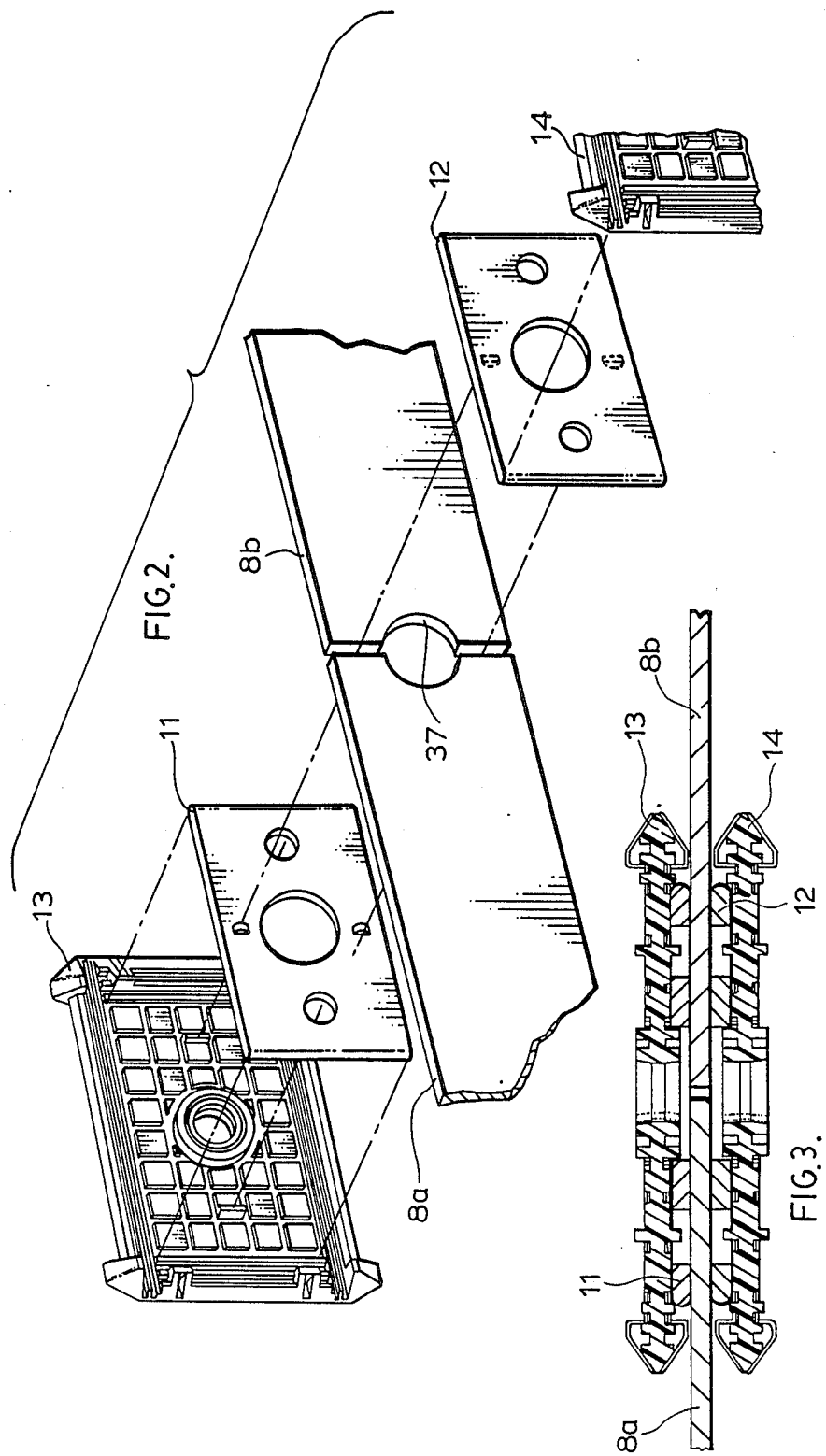

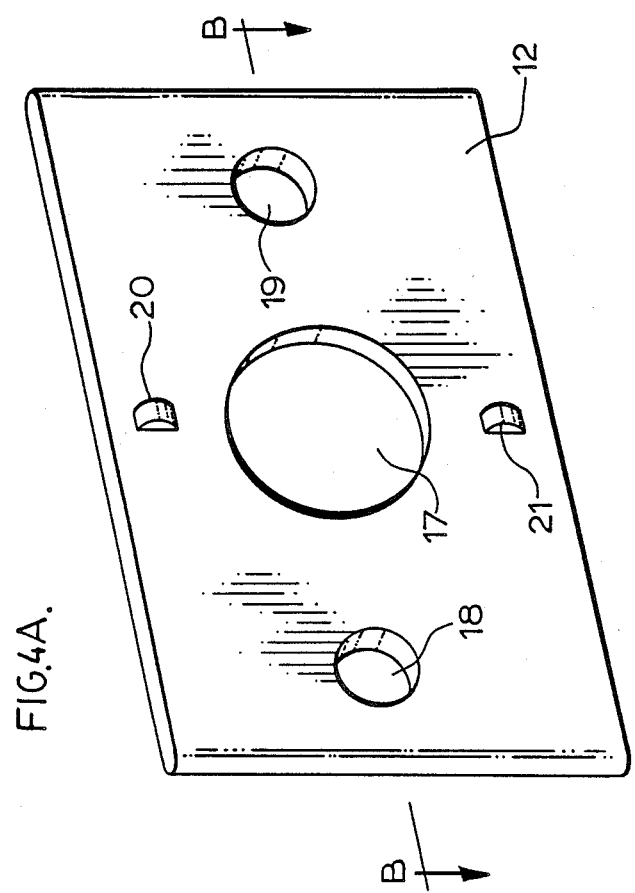
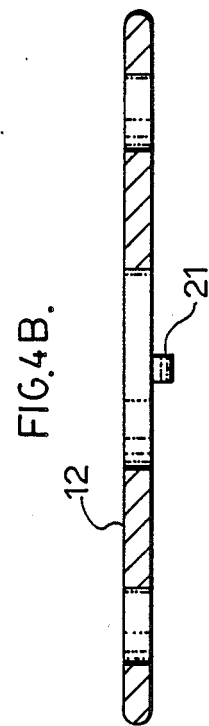

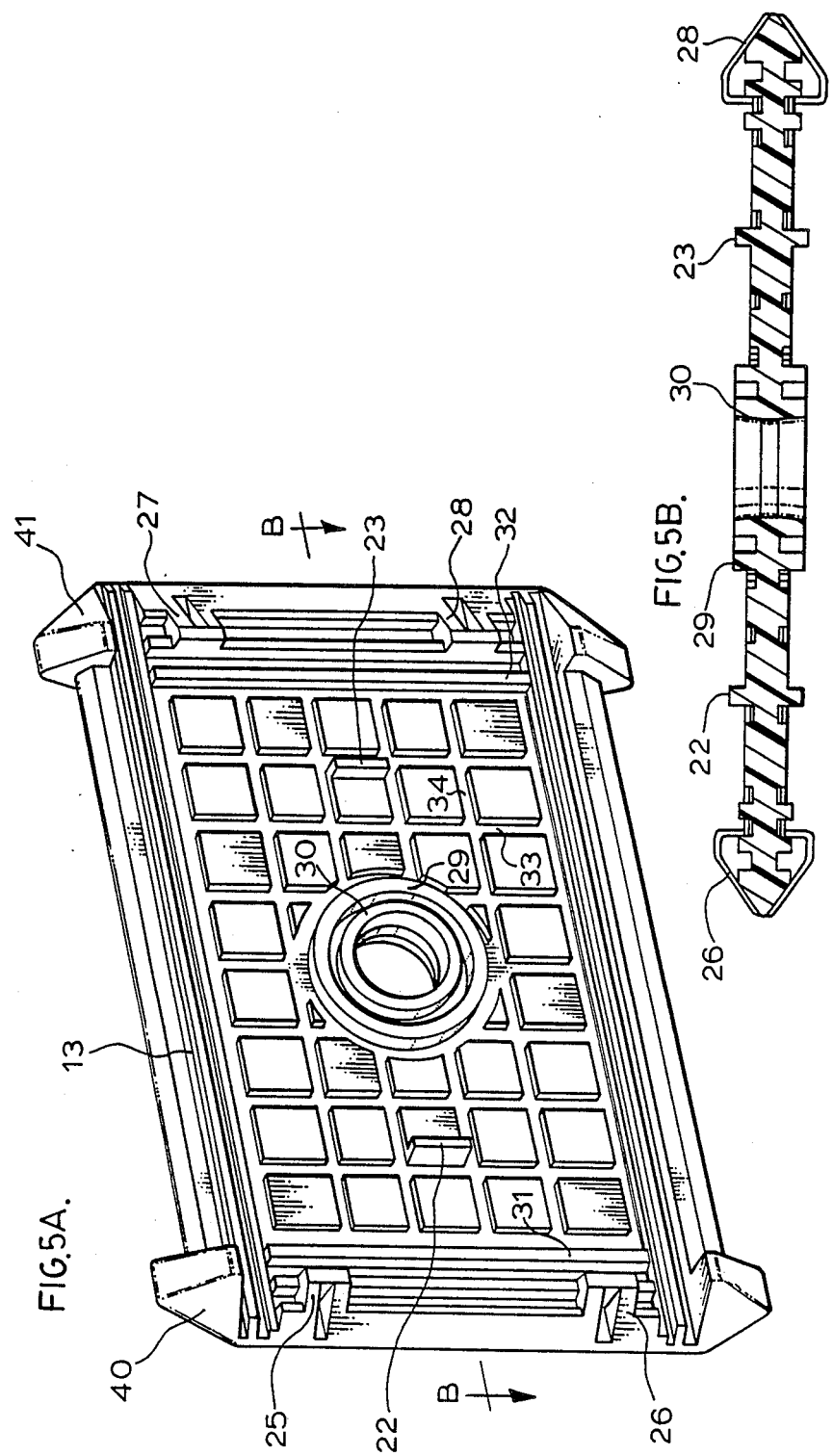

BUS DUCT JOINT

FIELD OF THE INVENTION

This invention relates to electrical bus duct and, in particular, to means for joining sections of bus duct.

DESCRIPTION OF THE PRIOR ART

Bus duct is normally supplied by manufacturers in standard lengths which must be connected together. In some cases the sections of the ends of the buses within the duct may require as many as six bolts per bus and with a duct containing six to sixteen buses, it is evident that the number of bolted connections may be quite large and the time consumed in making a joint will be substantial.

Efforts have been made in the past to overcome the difficulty of such inter-connection and to simplify the joint. Bolted joints, of course, require that the bus be off-set at its ends so that the resultant sections align, this is accomplished by off-setting the opposite ends of the bus. This requires an additional operation on the end of the buses and results in increased cost.

It has been proposed in the past to overcome this by using a conducting link which is fastened to each of the buses which is desired to inter-connect. Typical of such prior connections is that shown in Canadian Patent No. 1,010,128. In the arrangement shown in that patent, a pair of conducting links are bolted to the end of a bus and may be slid over the end of a second bus to which the first bus is to be connected. Compressive force of the bolt squeezes the connecting links in to contact with the buses while suitable insulating means are provided to isolate the buses and the connecting links of opposite phase from each other. A number of buses may be inter-connected in this manner and compressively held in contact by means of a single bolt. Such arrangements require some means to ensure that, when assembled, various elements, such as the conducting links and the intervening insulators are properly aligned and that the bolt provides sufficient force to ensure proper contact between the conducting links and the buses.

In the aforesaid Canadian patent, the bolt will be seen to be located to one side of the centre of the conducting links. It will be evident, therefore, that the forces applied by the bolt are not evenly distributed and that the forces applied to compress the conducting links against the buses will not be evenly distributed and, therefore, the connection between the buses may be unequal. It is quite evident that in order to produce a low resistance connection between the two buses it is most desirable that the forces applied to both buses be substantially equal and be sufficient to ensure that proper contact is maintained even in the presence of thermal variations caused during operation.

Canadian Patent No. 650,972 shows an example where the conducting links are fastened to their insulators by means of screws threaded into the insulators. It will be evident that such a structure reduces effective insulating space and produces a high stress location between the ends of the screws. It will also be evident that structures of this kind where the conducting link is in continuous contact with the insulator tend to trap heat and prevent any dissipation of such heat which may be generated at the joint.

Canadian Patent Nos. 833,154 and 834,926 also illustrate a bus joint, but here also, in an attempt to ensure proper location of the various elements with respect to each other and with respect to the bus, the conducting links are inset in to the insulators. In addition, all of the prior art structures apply compressive force either to one side of the conducting link or to a point in between the two buses so that when the compressive force is applied there is a tendency to bend both the insulators and the conducting links with obvious detrimental effect.

SUMMARY OF THE INVENTION

In accordance with the present invention, a single bolt compression joint for bus ducts is provided with means for locating the joint with respect to the ends of the bus bars to be joined and with respect to the insulators which intervene between the conductive members. The joint is such that the modification of the ends of the bus bars is minimal and completely uniform for both ends of all the bus bars to be interconnected. The inter-connecting plates are, in addition, sufficiently exposed to the air to permit convective cooling when heating occurs at the joint and the compressive force is applied in such a manner as to minimize the bending moment on the joint to maximize the distribution of compressive force over the ends of the buses being connected.

A clearer understanding of our invention may be had from consideration of the following description and the drawings in which:

BRIEF DESCRIPTION OF THE DRAWINGS

FIG. 1 is an illustration of the ends of two sections of bus duct. Each duct including six buses connected with a joint in accordance with this invention.

FIG. 2 is an exploded partial view of the bus duct joint.

FIG. 3 is a cross-sectional view of a bus duct joint as composed by the components of FIG. 2.

FIGS. 4A and 4B show a perspective and sectional view of an interconnecting link.

FIGS. 5A and 5B show a perspective and a partial sectional view of the insulator used in this invention.

Considering first FIG. 1, there is shown a first section of bus duct 2 and a second section of bus duct 3, only the ends of each of these bus ducts are shown and portions of the duct have been removed to expose the buses within the duct. These buses designated 4A, 5A, 6A, 7A, 8A and 9A in duct 2 and 4B, 5B, 6B, 7B, 8B and 9B in duct 3, are arranged to be interconnected by means of a single compression joint bearing the general designation 10. This joint includes a number of conductive links, two for each bus, for example buses 8A and 8B are inter-connected by conductive links 11 and 12 which are arranged on each side of buses 8A and 8B. These conductive links are manufactured from the same material as the buses, for example, they will be formed from copper and coated with a suitable non-oxidizing coating such as tin or silver as desired. The conductive links are isolated from each other and the spacing between the buses is maintained by means of intervening insulators such as insulators 13 and 14 which lie on the outer side of conductive links 11 and 12 respectively. In similar manner, conductive links are associated with buses 4A, 4B, 5A, 5B, 6A, 6B, 7A, 7B, 9A and 9B. A bolt 15 with an insulating sleeve 35 passes through holes in the conductive links 11 and 12 and in the insulating spacers 13 and 14 and applies adjustable compressive force to the joint by tightening of nut 16. The specific form of the conductive link and the insulating spacer associated with the link are shown in greater detail in FIGS. 2 and 3. As will be seen in FIGS. 4A and 4B, the conductive link 12 is of rectangular form having a vertical dimension, as illustrated, equal to the dimension of the buses to be inter-connected and a thickness equal to the thickness of the bus. The conductive link 12 has a central hole 17 through which bolt 15 can pass, of sufficient diameter to permit insulation between the bolt and the conductive link. Conductive link 12 is also provided with a further pair of holes 18 and 19 which co-operate with projections on the insulating spacer 13. The conductive links are also provided with a pair of projections 20 and 21 formed by partially shearing and striking up a portion of the conductive material. The purpose of these projections will be later explained when the assembly of the joint is completely described.

It will also be noted that the edges of the conductive plates are rounded with a suitable radius, approximately one half their thickness.

Turning now to FIGS. 5A and 5B it will be seen that the insulating spacer 13 is a molded plastic member preferably made from a suitable thermoset polyester glass reinforced material. It will be seen that the spacer 13 is substantially similar in shape to the conductive link but slightly larger so that the conductive link when assembled with the spacer falls wholly within the perimeter of the spacer, its location in the spacer is determined by the projections 22, 23 which pass through holes 18 and 19 respectively in the conductive link.

The dimensions of holes 18 and 19 and projections 22 and 23 are determined so as to produce an interference fit and by means of their resilience frictionally retain the conductive link on the face of the insulating spacer once it has been forced into position. The projections 40, 41, 42 and 43 determine the location of the insulating spacer with respect to the ducts which are being joined and make it convenient to ensure the insulators are properly aligned during assembly. Projections 25, 26, 27 and 28 assist in guiding the ends of the buses smoothly between the conductive links during assembly.

In the centre of the insulating separator are a pair of raised rings. The outermost ring 29 has an outside diameter which corresponds to the diameter of hole 17 in the conductive link. The inner ring has an inner diameter 30 which is sufficiently large to permit bolt 15 and its insulator to pass through. The raised ridges 31 and 32 at each end of the insulating spacers 13 provide the proper tracking distance between the conductive links of opposite phases over the surface of the insulator. The surface of the insulating spacer is also provided with a number of channels, such as channels 33 and 34, which permit air to pass between the conductive link 12 and the insulating spacer 13. It will also be seen that the edges of the insulating spacer are tapered, as shown in detail in FIGS. 3B and 3C. It will also be seen in these figures that the hole through the centre of the insulating spacer is tapered from each end towards the centre to facilitate the entry of insulating sleeve 35 when assembling the joint.

Holding plates 38 form the outer member on each side of the joint and include a hole through which bolt 15 may pass and a retained washer 39 centered on the hole. A flange on the holding plate is shaped to fit onto the surface of the duct 2 and may be retained thereon by suitable fastening member such as bolts 40. A pressure plate 13A, similar to a conducting link but not contacting a bus, is pressed into the outer face of the outer insulating spacers.

ASSEMBLY

In assembling the joint, an insulating sleeve 35 is slipped over bolt 15 together with a washer 36 and a conductive link is pressed into the face of each of the insulating spacers. Bolt 15 is then passed through washer 39 on holding plate 38 and the insulators and conductive links are then assembled on the bolt in a manner shown in FIG. 1 together with the final holding plate 38 and the assembly is slipped over the end of one of the sets of buses. The tapered ends of the insulating spacers and the rounded edges of the conducting links assist in this operation which can be performed either by slipping the members down over the buses or inward from the end of the buses. The complete joint assembly is then held fixed on one end of duct 2 by means of bolts 40 through the flange of the holding plate.

With the joint held in place on the end of the duct, the other set of buses may now be introduced either from above or from one end. It will be seen that each bus is provided with a notch in its end such as notch 37, which is semi-circular and of a radius the same as the radius of ring on the insulating spacer. The two sections of bus are now moved in towards each other as far as they can go until the ends of the ducts meet. Projections 20 and 21 ensure that the conductive links are properly located at right angles to the buses. These projections also prevent the buses from damaging ring 29 or insulator 35 since they limit the travel of the buses towards each other.

With the two sections of the bus duct pushed towards each other as far as they can go, the bolt 15 may now be tightened by reaching through a suitable aperture in the duct and rotating nut 16 thus compressing the whole joint and firmly squeezing the buses between the conductive links. Because the notches 37 substantially completely surround the bolt, the compressive force applied is equally distributed over the ends of the buses with a minimum bending force being applied to the conducting links or insulators. In its assembled condition, with the bolt sufficiently tightened to ensure proper contact, the conductive links are still spaced from the insulating spacers and convection cooling of the joint is possible. Since the compressive force is critical to the proper operation of the joint, it is desirable that the bolt be tightened either by means of a torque wrench or be provided with a shear head which establishes the maximum torque applied. Because of the contour of the insulating spacers, the joint may be assembled from any direction either by slipping the bus duct down over the joint or by pushing the bus duct in from the end of the joint. This adds greatly to the convenience of assembly, and because of the provision of projections 20 and 21, when the bus ducts are properly presented to each other and pushed together as far as they will go, the joint is properly located with respect to both sets of buses. It will also be noted that all the components used are completely uniform. All of the insulating spacers are identical and all of the conductive links are identical. The preparation of the ends of the buses is simple and identical for each end. There is no off-set required of the buses and either end of a bus unit may be connected to either end of any other bus unit, thus simplifying assembly.

While the invention has been described with a single compression bolt, it will be understood that if the buses are wide, for example six or seven inches, it may be necessary to use a pair of bolts with correspondingly modified spacers and links, otherwise the structure can be identical to that shown. It will also be understood that while details of the insulating spacer have been shown, these details are designed to meet specific creep distances necessary between opposite phases. Other details of the conductive link and bolt will vary depending upon the current rating, but a single type of joint can be designed which will operate in a variety of situations, for example, the same elements may be used whether there are six buses in the duct, eight or more, it is only necessary to increase the number of elements in the joint as determined by the number of buses to be interconnected.

We claim:

1. A bus duct joint comprising a pair of separate serially connected lengths of bus duct, each of said lengths of bus duct including a plurality of flat elongated relatively closely spaced bus bars disposed in flatwire stacked insulated relationship to each other, a plurality of rectangularly shaped conductive links having central holes, and extending in a parallel relationship with said bus bars to overlap and contact the adjacent ends of the bus bars of similar phases to be joined, the ends of the bus bars having recesses of a semicircular nature to permit acceptance of a bolt and insulating sleeve therein; a plurality of rigid insulators of substantially flat rectangular shape for receiving said conductive links on each side thereof so as to form a conductive link-insulator-conductive link sandwich in the space between adjacent bus bars, a bolt passing through holes in said insulators and insulated from but passing through the holes of said links and through a circular aperture formed by said semicircular recesses in the adjacent ends of said bus bars, a nut engaging the end of said bolt and arranged when tightened to apply compressive force to said links, bus bars and insulators, forcing the links into contact with said bus bars with a substantially uniform pressure on the surfaces of each of the bus bars to be joined.

2. A bus duct joint as claimed in claim 1 wherein said insulators extend beyond the edges of said links and include means to positively locate said links with respect to said insulators.

3. A bus duct joint as claimed in claim 2 wherein said insulators include means (22, 23) to positively locate said insulators with respect to said said links.

4. A bus duct joint as claimed in claim 3 wherein the insulators include tapered projections (25, 26, 27, 28) which guide and wedge the insulators between adjacent bus bars.

5. A bus duct joint as claimed in claim 4 wherein said insulators include channels on their surfaces where they engage said links sufficient to permit air to freely flow between said insulator and the adjacent link.

6. A bus duct joint as claimed in claims 1, 2 or 3 wherein said insulators are provided with raised circular rings around their holes.

7. A bus duct joint as claimed in claims 1, 2 or 3 wherein said links are provided with projections on their surfaces on each side of their central holes to positively align said links with said bus bars by engagement of said projections with the ends of said bus bars.

8. A bus duct joint as claimed in claims 1, 2 or 3 wherein the said holes in said insulators are tapered from a greater diameter at each end of the hole to a lesser diameter in the middle of the hole.

9. A bus duct joint as claimed in claim 2 wherein said links when assembled with said insulators are frictionally engaged and retained by said insulators.

10. A bus duct joint as claimed in claim 1 wherein the ends of all the bus bars are unmodified except for the semicircular recesses provided in the ends thereof.

11. A bus duct joint as claimed in claim 10 wherein said insulators are provided with raised rings around their holes.

* * * * *